United States Patent [19]
Herschberger

[11] 4,304,304
[45] Dec. 8, 1981

[54] PLANTER V-WING AND ATTACHMENT THEREFOR
[75] Inventor: Henry D. Herschberger, Arthur, Ill.
[73] Assignee: Lloyd Younger, Bethany, Ill.; a part interest
[21] Appl. No.: 111,651
[22] Filed: Jan. 14, 1980
[51] Int. Cl.² ............................................. A01B 49/04
[52] U.S. Cl. ..................................... 172/252; 111/85; 172/198; 172/690
[58] Field of Search ............... 172/197, 198, 199, 200, 172/201, 202, 250, 252, 253, 391, 690, 694, 695, 697; 37/2 R; 171/105; 111/85

[56] References Cited
U.S. PATENT DOCUMENTS

| 1,121,468 | 12/1914 | Buckley | 172/690 |
| 1,324,728 | 12/1919 | Classon | 172/198 |
| 1,461,053 | 7/1923 | Vanicek | 172/198 |
| 1,477,846 | 12/1923 | Okamoto | 172/690 |
| 2,508,542 | 5/1950 | Sacksteder | 172/252 |
| 4,224,995 | 9/1980 | Alberger | 37/2 R X |

FOREIGN PATENT DOCUMENTS 2808882 9/1979 Fed. Rep. of Germany ........ 111/85
875468 6/1942 France ................................... 111/85

OTHER PUBLICATIONS

"V-wing" and Tine Teeth on pp. 28 and 29 respectively of *Drawn and Integral Planters*, John Deere, received in P.T.O., Jan. 9. 1980.

Primary Examiner—Richard T. Stouffer
Attorney, Agent, or Firm—Julian Caplan

[57] ABSTRACT

Commercially available seed planters have V-wings mounted immediately in front of the seed openers to sweep clods away and skim off the top player of the bed. However, V-wings are not effective in trashy and sticky soils. The attachment of the present invention is mounted on the V-wing and has downward-rearward directed fingers extending below the V-wing. The fingers push clods and trash away and assist in maintaining uniform depth in all soils.

2 Claims, 3 Drawing Figures

PLANTER V-WING AND ATTACHMENT THEREFOR

This invention relates to a new and improved finger attachment for planter V-wings. The present invention is illustrated is an attachment to a conventional John Deere planter but is adaptable to other planters. V-wing attachments have been provided as optional equipment to sweep clods out of the way of the seed opener of the planter and to skim off the top layer of a seed bed. Such V attachments are mounted depending from the frame of the planter and comprise horizontal sheet metal wings which converge forwardly. Such wings are not recommended for trashy or sticky soils. The present invention provides an additional attachment to the V-wing attachment which makes the tool adaptable for trashy and sticky soils. Essentially it is a part which is mounted on the V-wing and has a plurality of fingers extending below the lower edge of the V-wing, these fingers being directed downwardly-rearwardly.

The present invention greatly improves the job of the V-wing attachment by making a better seed bed, pushing clods and trash out of the way ahead of the seed opener.

Another feature of the invention is that it permits planting in trashy and clay soils without trouble, keeping the V-wing attachment going at a more uniform depth throughout all of its path.

One of the features of the invention is the fact that the attachment of the present invention can be either bolted or welded to an existing V-wing attachment, or it may be made a part of the original equipment. Bolting the frame of the present invention to the V-wing is preferred since it may be removed when not needed or for replacement.

Still another feature of the invention is its low cost of manufacture and installation.

A conventional V-wing is vertically adjustable and is usually adjusted so that the lower edge of the V-wing slices into the soil. In accordance with this invention, the finger attachment is located so that the fingers rake the soil. Hence, the V-wing is raised from what would otherwise be its position so that only the fingers contact the soil. The fingers then rake trash, clods and other materials and the V-wing deflects these materials away from the seed opener.

Other objects of the present invention will become apparent upon reading the following specification and referring to the accompanying drawings in which similar characters of reference represent corresponding parts in each of the several views.

Seed planters are produced by numerous manufacturers and vary in details of construction. The planter illustrated herein is a portion of a John Deere seed planter for corn, but it will be understood that the invention may be used for many other pieces of equipment.

Planter 11 has ground wheels 12 which support the various elements hereinafter set forth. Seed opener wheels 13 are provided to open a furrow into which seed is dropped through the seed tube 14. A seed firmer 16 usually presses the seed into the bottom of the furrow.

Figure 1:
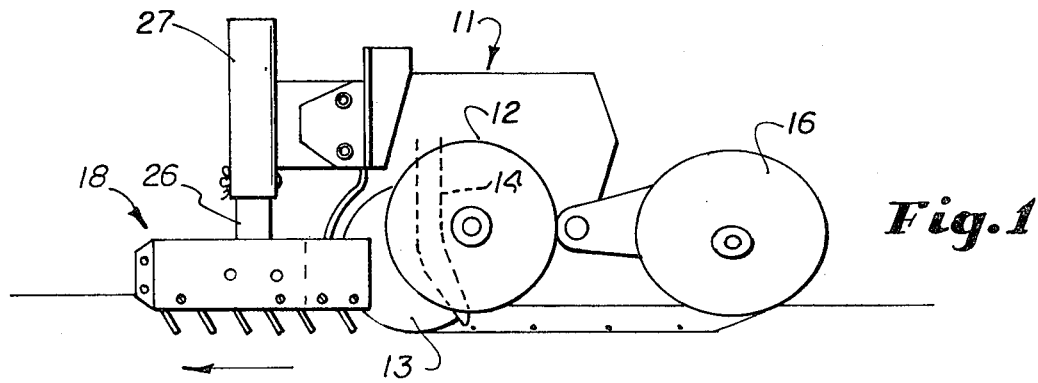
FIG. 1 is a schematic side elevational view of a seed planter on which the present invention is installed.
Figure 3:
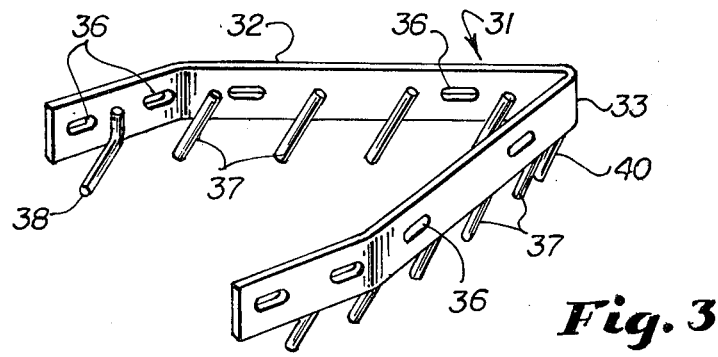
FIG. 3 is a perspective view of the attachment of the present invention.
Figure 2:
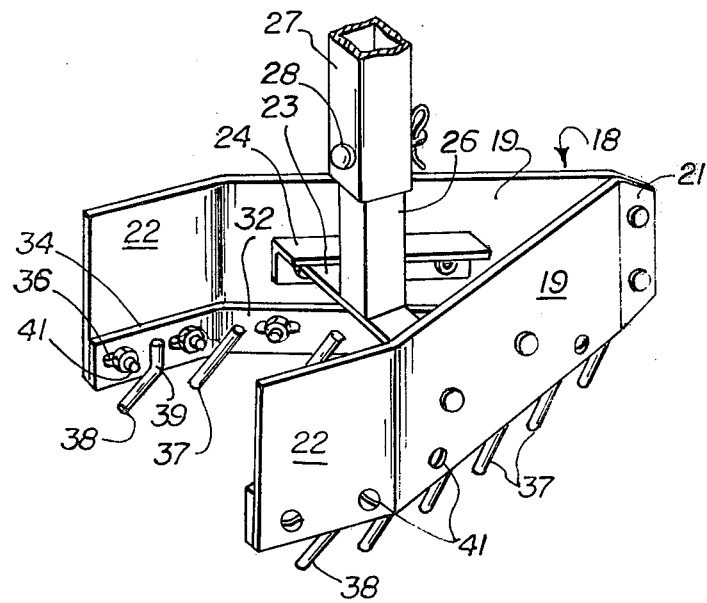
FIG. 2 is an enlarged perspective view of the present invention mounted on a V-wing.

An existing improvement on such seed planter is a V-wing 18. Such a V-wing is formed of sheet metal having forwardly converging sides 19 which are bent to come together in a point 21 at the front of the attachment. At the rear of the attachment are extensions 22 which are parallel to each other. A means for mounting V-wing 18 is illustrated in FIG. 2. Thus, there is a horizontal cross member 23 extending between the sides 19 adjacent their rear end which is attached to the sides by means of angle brackets 24. Welded to the cross member 23 is the lower end of lower mounting support 26 which telescopes into upper support 27 and is adjustably secured in position by a bolt 28 which may selectively be passed through vertically spaced holes (not shown) in lower support 26. The upper support 27 is secured by means having no importance to the present invention to the frame of the planter 11.

The present invention comprises a finger attachment 31 which is preferably fabricated of flat bar stock to fit immediately inside the V-wing 18 and is fastened to the lower edge thereof.

Thus, there are forwardly converging sides 32 which come to a point 33 which is located immediately behind point 21. There are also rearward extensions 34 behind the sides 32 which are parallel to the extensions 22. As particularly shown in FIG. 2, the lower edges of the members 32, 34 are preferably co-extensive with the lower edges of members 19, 22. Horizontal slots 34 are preferably formed in members 32, 34 and are secured to members 19, 22, by means of bolts 41. Alternatively, the finger attachment 31 may be welded to the V-wing 18.

Welded to members 32 are fingers 37 of round rod stock which slant downwardly-rearwardly and project below the members 32. Rear fingers 38 are welded to the rear extensions 34 and are preferably formed with a bend 39 so that they are in direct line with the fingers 37. Welded adjacent point 33 is front finger 40.

The member 31 may be attached to the member 18 by bolts 41 or by riveting. Bolts 41 are preferred if the attachment 31 is to be used intermittently. In the field, the planter 11 is used in the same manner as previously except that the fingers 37, 38, 40, produce the advantages which have heretofore been set forth.

What is claimed is:

1. In combination a V-wing of the type comprising forwardly converging upstanding flat plate sides and longitudinal rear extensions integral with and behind said sides, said sides each including upper and lower edges, support means for supporting said V-wing from a planter in front of a seed opener on said planter, said support means being connected to said V-wing and extending downwardly to a level intermediate the upper and lower edges of said wing sides and an attachment comprising an integral frame having upstanding flat plate frame sides immediately inside said wing sides and having their lower edges at the level of the lower edges of said wing sides and their upper edges spaced below the level of said support means, securing means securing said frame to said V-wing, and a plurality of downwardly-rearwardly slanted, rod-like fingers welded to said frame depending below the lower edge of said frame.

2. An attachment according to claim 1 in which said frame has rear frame extensions inside said rear extensions of said V-wings, at least one of said fingers being located on each of said rear frame extensions, said one finger being bent in line with the other of said fingers, said frame converging to a point, and a front finger fixed to said frame where said frame converges at said point.

* * * * *